(12) United States Patent
Matsubara

(10) Patent No.: US 8,795,880 B2
(45) Date of Patent: Aug. 5, 2014

(54) BATTERY HAVING AN ELECTRODE TERMINAL FIXED TO A BATTERY CASE

(75) Inventor: Masanori Matsubara, Kasugai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 632 days.

(21) Appl. No.: 12/624,447

(22) Filed: Nov. 24, 2009

(65) Prior Publication Data

US 2010/0129709 A1 May 27, 2010

(30) Foreign Application Priority Data

Nov. 27, 2008 (JP) .................. 2008-302624

(51) Int. Cl.
*H01M 2/02* (2006.01)
*H01M 2/08* (2006.01)
*H01M 2/30* (2006.01)

(52) U.S. Cl.
CPC ............... *H01M 2/021* (2013.01); *H01M 2/30* (2013.01)
USPC ............ 429/179; 429/178; 429/181; 429/185

(58) Field of Classification Search
USPC .......................................... 429/180–184, 179
See application file for complete search history.

(56) References Cited

U.S. PATENT DOCUMENTS

| | | | | |
|---|---|---|---|---|
| 4,241,152 A | * | 12/1980 | Klink | 429/181 |
| 4,559,283 A | * | 12/1985 | Kruger et al. | 429/174 |
| 4,859,547 A | * | 8/1989 | Adams et al. | 429/121 |
| 4,879,191 A | * | 11/1989 | Sindorf | 429/181 |
| 2003/0104276 A1 | * | 6/2003 | Mizuno et al. | 429/181 |
| 2005/0118501 A1 | * | 6/2005 | Hashimoto et al. | 429/180 |
| 2006/0115727 A1 | * | 6/2006 | Kim et al. | 429/181 |
| 2006/0159988 A1 | * | 7/2006 | Kang et al. | 429/156 |

FOREIGN PATENT DOCUMENTS

| | | |
|---|---|---|
| EP | 0598 136 B1 | 5/1994 |
| JP | 58-34102 | 2/1983 |
| JP | 63-214427 | 9/1988 |
| JP | 3334804 | 8/2002 |
| JP | 2005339990 A * | 12/2005 |

OTHER PUBLICATIONS

JP 2005-339990 A Machine Translation.*

* cited by examiner

*Primary Examiner* — Maria J Laios
*Assistant Examiner* — Robert S Carrico
(74) *Attorney, Agent, or Firm* — Finnegan, Henderson, Farabow, Garrett & Dunner, LLP

(57) ABSTRACT

A battery (100) includes a terminal fixing portion (40) projecting outwardly from a lid body (14), and an outer cover member (60) covering the terminal fixing portion (40). The terminal fixing portion (40) includes a hole (42) into which an electrode terminal (30) is inserted. The outer cover member (60) includes a cylindrical portion (62) (deformation restricting portion) covering an outer peripheral surface (40*b*) of the terminal fixing portion (40) and restrict deformation of the outer peripheral surface (40*b*) of the terminal fixing portion (40), and a pressure application portion (64) that compresses against a top end portion (40*a*) of the terminal fixing portion (40) and causes the terminal fixing portion (40) to deform.

18 Claims, 13 Drawing Sheets

FIG. 4
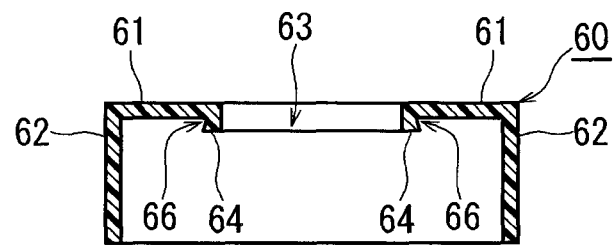
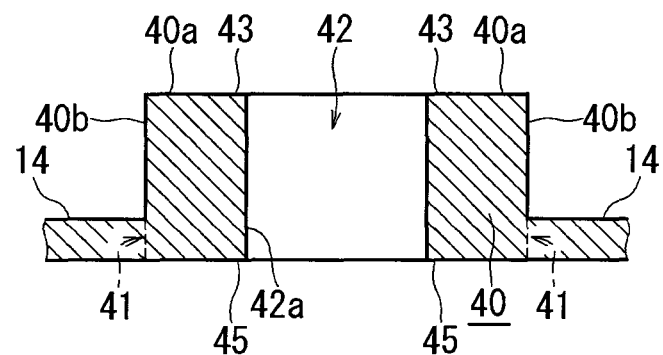
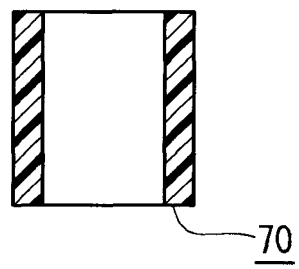
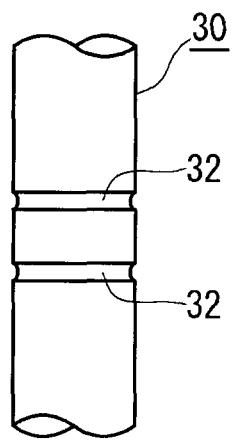

BATTERY HAVING AN ELECTRODE TERMINAL FIXED TO A BATTERY CASE

BACKGROUND OF THE INVENTION

1. Field of the Invention

The present invention relates to a battery, and more particularly to a battery in which an electrode terminal is fixed to a battery case in an inserted state. Note that this application claims priority under the Paris Convention based on Japanese Patent Application 2008-302624, filed on Nov. 27, 2008, the entire contents of which are incorporated into this application by reference.

2. Description of the Related Art

In recent years, lithium ion batteries, nickel hydrogen batteries, and other secondary batteries have grown in importance as power supplies installed in vehicles or power supplies for personal computers and portable terminals. These batteries are structured such that an electrode body is accommodated in a battery case. An electrode terminal is fixed to the battery case in an inserted state, and the electrode terminal is connected to the electrode body in the interior of the battery case.

Method for fixing such electrode terminal includes, for example, inserting the electrode terminal through a hole formed in the battery case and then sealing the hole. Further, for a modification of this sealing structure is described in Japanese Patent No. 3,334,804. In the sealing structure described in this publication, a penetrating member is passed through a hole provided in a metallic partition wall member, whereupon a sealing member is disposed between the penetrating member and the hole. Pressure is then applied to a peripheral edge portion of the hole in an axial direction such that an inside surface of the hole is plastically deformed toward an inner diameter side, and thus sealing the hole. Note that in this publication, a structure in which a signal line extends from a pressure container is being described as an embodiment of the sealing structure.

Further, although not techniques for sealing a hole in which an electrode terminal is inserted, Japanese Patent Publication H7-53422 and Japanese Patent Publication S64-2641 disclose similar techniques in which pressure is applied to a certain member to cause the member to deform in a direction different from the pressure application direction.

The sealing structure described in Japanese Patent No. 3,334,804, for example, is proposed as a structure for sealing a signal line extension part in a structure in which a signal line extends from a pressure container containing high-pressure working oil. With this structure, a rod-shaped member (penetrating member) is inserted through a hole formed in a partition wall, whereupon pressure is applied to a peripheral edge portion of the hole in the axial direction to plastically deform the inside surface of the hole toward the inner diameter side, thereby fixing the rod-shaped member and sealing the hole.

SUMMARY OF THE INVENTION

However, when this sealing structure is being applied as an electrode terminal sealing structure for battery, the electrode terminal may not be successfully fixed, depending on the battery structure. More specifically, battery case used in secondary battery such as that described above requires to be light in weight, and hence a comparatively lightweight metal such as aluminum alloy or the like is being employed. Furthermore, there is limitation to the size of the battery case, for example, and it may be impossible to provide the site through which the electrode terminal is inserted with sufficiently thickness. Hence, even when a hole is formed in the battery case, through which the electrode terminal is inserted, and pressure is applied to the peripheral edge portion of the hole in the axial direction, the site in which the electrode terminal is inserted may deform toward an outer diameter side, and the inside surface of the hole cannot be plastically deformed toward the inner diameter side. Accordingly, the present invention proposes a novel structure in which an electrode terminal is fixed to a battery case in an inserted state.

A battery according to the present invention, in which an electrode terminal is fixed to a battery case in an inserted state, includes: a terminal fixing portion that projects outwardly from the battery case and includes a hole into which the electrode terminal is inserted; and an outer cover member covering the terminal fixing portion. In the present invention, the outer cover member includes: a deformation restricting portion that covers an outer peripheral surface of the terminal fixing portion and restrict deformation of the outer peripheral surface of the terminal fixing portion; and a pressure application portion that compresses against a top end portion of the terminal fixing portion and causes the terminal fixing portion to deform.

In this battery, the pressure application portion of the outer cover member compresses against the top end portion of the terminal fixing portion to deform the terminal fixing portion. Deformation of the outer peripheral surface of the terminal fixing portion is restricted by the deformation restricting portion of the outer cover member, and therefore an inside surface of the terminal fixing portion protrudes toward an inner diameter side. As a result, the electrode terminal inserted into the terminal fixing portion is fixed firmly to the terminal fixing portion.

In this battery, the terminal fixing portion may be tubular, and a sealing material may be attached between an inner periphery of the terminal fixing portion and an outer periphery of the electrode terminal. Thus, the terminal fixing portion can be sealed more securely. Further, the pressure application portion may be provided on the outer cover member so as to compress against an inside edge portion of the top end portion of the terminal fixing portion. Thus, deformation can be generated in a site that is closer to the inside surface of the terminal fixing portion. Further, the pressure application portion may be constituted by a projection provided on an inner side of a ceiling portion of the outer cover member. In this case, the top end portion of the terminal fixing portion can be formed into a recess, and therefore the top end portion of the terminal fixing portion can be deformed reliably. Furthermore, an indentation may be provided in a base end portion of the projection constituting the pressure application portion. In this case, a part of the terminal fixing portion is compressed into the indentation, thereby preventing the outer cover member from becoming dislodged from the terminal fixing portion.

Further, an outer peripheral surface of the deformation restricting portion may have a reinforcing shape pattern. The strength of the deformation restricting portion can be improved by this pattern. The outer peripheral surface of the deformation restricting portion may be provided with a rib, for example. Further, the outer cover member and the terminal fixing portion may include an engaging portion that engages the outer cover member with the terminal fixing portion while the outer cover member covers the terminal fixing portion. Thus, it is possible to prevent the outer cover member from becoming dislodged from the terminal fixing portion.

BRIEF DESCRIPTION OF THE DRAWINGS

FIG. 4 is a view showing a state prior to the assembly of each member constituting the electrode terminal of the battery according to an embodiment of the present invention;

DESCRIPTION OF THE PREFERRED EMBODIMENTS

Figure 1:
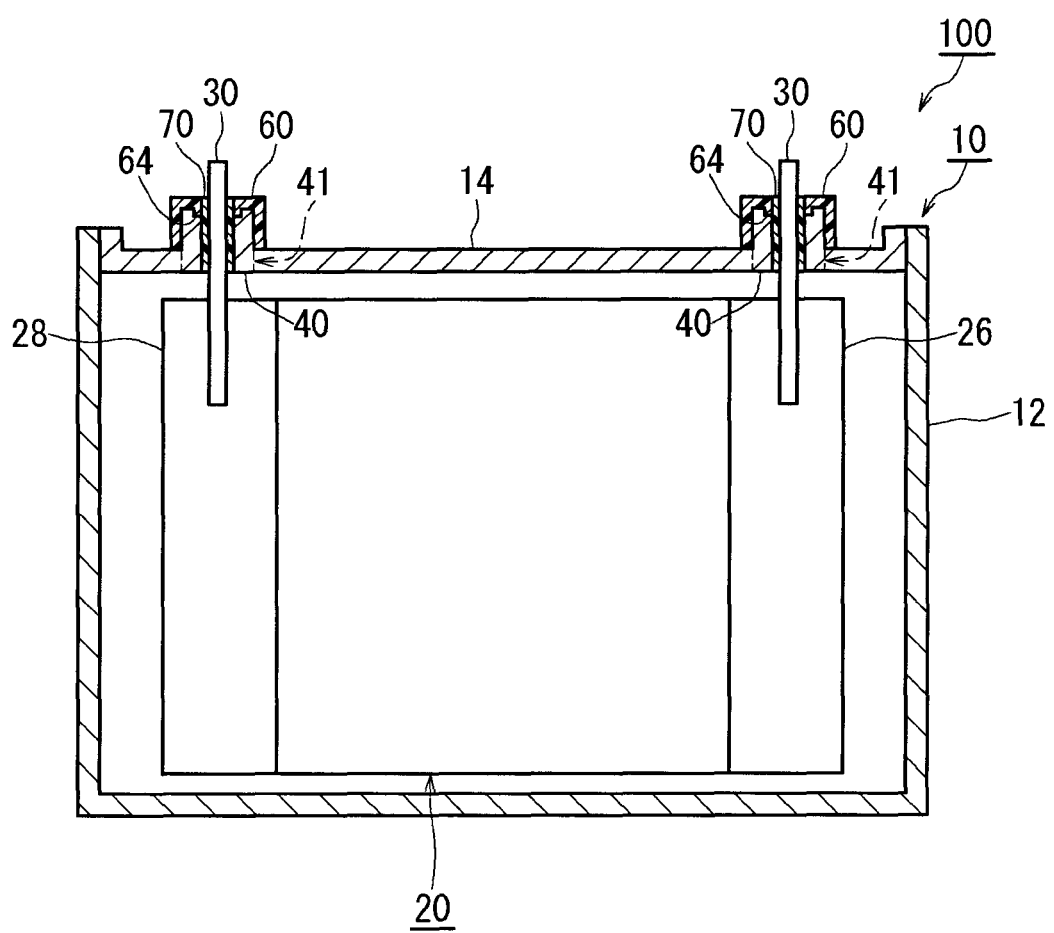
FIG. 1 is a schematic sectional view showing a battery according to an embodiment of the present invention.

Embodiments of the present invention will be described below with reference to the drawings. Note that the present invention is not limited to the following embodiments. Further, constitutional elements having substantially identical functions are allocated with identical reference numerals in the drawings where appropriate. Further, dimensional relationships (length, width, thickness, and so on) in each drawing do not reflect the actual dimensional relationships. Moreover, in this specification, the battery encompasses any storage elements that can be used in a similar manner in the industrial field. Examples of the battery include lithium ion battery (lithium secondary battery), nickel hydrogen battery, nickel cadmium battery, lead battery, or the like.

Figure 2:
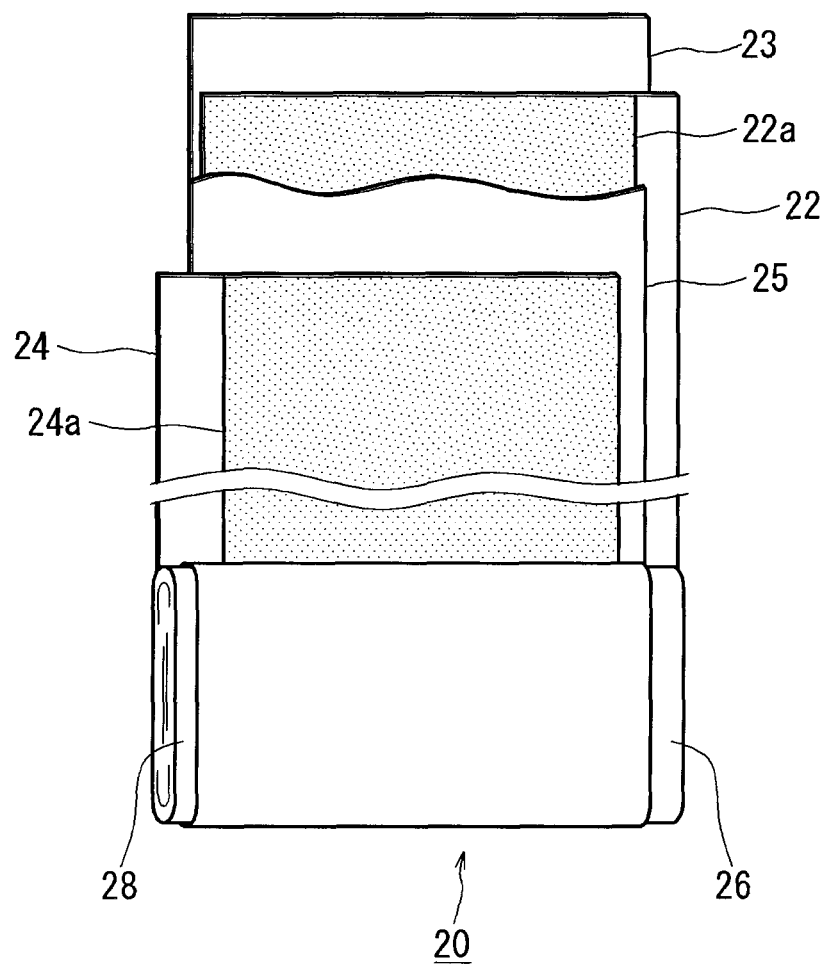
FIG. 2 is a view showing the structure of an electrode body of the battery according to an embodiment of the present invention.

FIG. 1 is a schematic sectional view showing a battery 100 according to an embodiment of the present invention. As shown in FIG. 1, the battery 100 is constituted by a battery case 10 and an electrode body 20. As shown in FIG. 1, the battery case 10 is constituted by a container main body 12 and a lid body 14. The container main body 12 is a flat angular container having an opened upper surface, and the lid body 14 is joined to the opening. FIG. 2 is a view showing the structure of the electrode body 20.

As shown in FIG. 2, the electrode body 20 is a so-called wound electrode body in which a positive electrode sheet 22 and a negative electrode sheet 24 are laminated together via separators 23, 25 and then wound. The electrode body 20 includes a positive electrode collector 26 and a negative electrode collector 28 on respective end thereof in a winding axis direction. The electrode body 20 is flattened and accommodated in the battery case 10, as shown in FIG. 1. In this embodiment, as shown in FIG. 1, two electrode terminals 30, i.e. a positive electrode terminal and a negative electrode terminal, are fixed in an inserted state to two discrete positions of the lid body 14. One of the electrode terminals 30 is electrically connected to the positive electrode collector 26 of the electrode body 20 in the interior of the battery case 10, while the other is electrically connected to the negative electrode collector 28.

Figure 3:
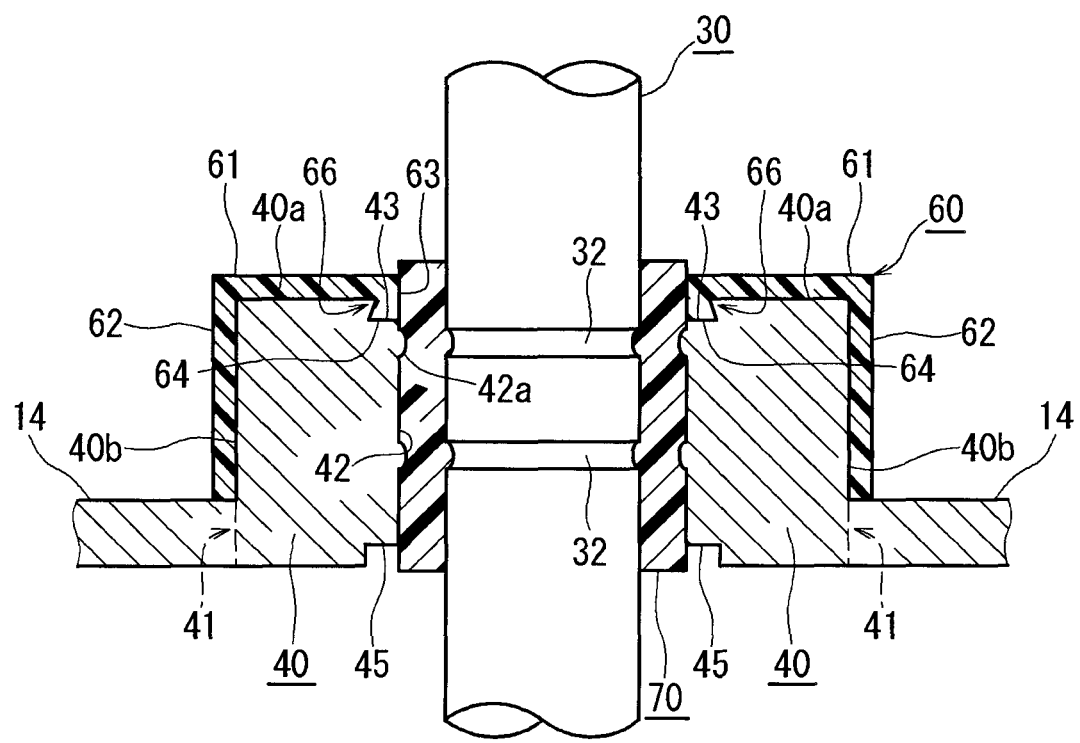
FIG. 3 is a sectional view showing an electrode terminal fixing structure of the battery according to an embodiment of the present invention.

FIG. 3 is a sectional view showing the part of the battery case 10 to which the electrode terminal 30 is fixed. The lid body 14 includes a tubular site (to be referred to hereafter as a terminal fixing portion 40) projecting outwardly from the battery case 10. A hole 42 (to be referred to hereafter as a through hole 42) is formed in the terminal fixing portion 40 and through the lid body 14. The electrode terminal 30 is inserted into the through hole 42 in the terminal fixing portion 40 with a sealing material 70 attached to an outer periphery thereof. Further, the terminal fixing portion 40 is covered by an outer cover member 60.

FIG. 4 shows a state prior to the assembly of each structural member of the part in which the electrode terminal 30 is fixed to the battery case 10. In this embodiment, the electrode terminal 30 is a rod-shaped member having a circular cross-section. Further, a groove 32 is formed around the outer periphery of the electrode terminal 30 and at an intermediate portion thereof. The sealing material 70 attached to the outer periphery of the electrode terminal 30 is a tubular member having a required elasticity and insulating property.

Figure 5:
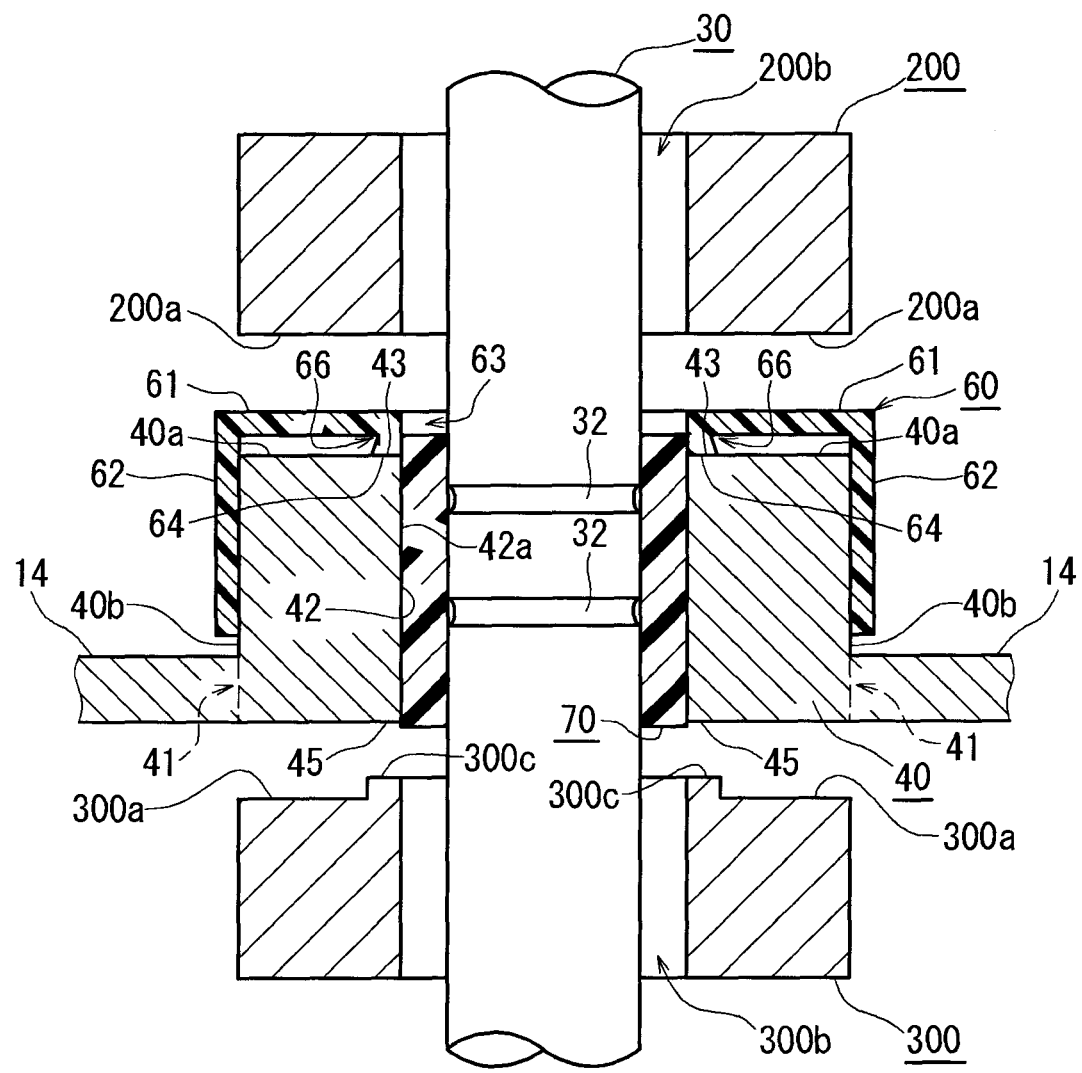
FIG. 5 is a view showing a process for fixing the electrode terminal of the battery according to an embodiment of the present invention.

FIG. 5 shows a state in which the electrode terminal 30 to which the sealing material 70 is attached is fitted into the through hole 42 in the terminal fixing portion 40. As shown in FIG. 5, the through hole 42 in the terminal fixing portion 40 has an inner diameter to sufficiently accommodate the electrode terminal 30 with the sealing material 70 attached to its outer periphery such that the sealing material 70 and the electrode terminal 30 are closely fitted into the through hole 42.

In this embodiment, the terminal fixing portion 40 is formed as a separate tubular member composed of a different material to the lid body 14 and welded to the lid body 14. A broken line 41 in FIGS. 3 to 6 denotes a welding site of the terminal fixing portion 40. Specifically, in this embodiment, the terminal fixing portion 40 is composed of a material having greater hardness than the other parts of the lid body 14. More specifically, the terminal fixing portion 40 according to this embodiment is composed of a 5000 series aluminum alloy material, whereas the remainder of the lid body 14 is composed of a 1000 series aluminum alloy material. An aluminum alloy material is a reasonably priced, widely available general-purpose material used in numerous fields. Further, characteristics such as the material strength and workability of the alloy material differ according to the composition of elements added thereto (the alloying element, for example Mg, Cu, Si, Mn, or the like), and the alloy material is classified into 1000 series to 7000 series aluminum alloys. In this embodiment, a comparatively widely available aluminum alloy material is used for the lid body 14 excluding the terminal fixing portion 40. On the other hand, an aluminum alloy material exhibiting the required hardness is used for the terminal fixing portion 40. Note that the materials of the lid body 14 and the terminal fixing portion 40 are not limited to those described above.

Next, the outer cover member 60 will be described. The outer cover member 60 is a member covering the terminal fixing portion 40. The outer cover member 60 includes a deformation restricting portion 62 that covers an outer peripheral surface 40b of the terminal fixing portion 40 to restrict deformation of the outer peripheral surface 40b of the terminal fixing portion 40. The outer cover member 60 also includes a pressure application portion 64 that compresses against a top end portion 40a of the terminal fixing portion 40 to cause the terminal fixing portion 40 to deform.

In this embodiment, the outer cover member 60 is composed of a substantially tubular member having a ceiling. A cylindrical portion 62 of the outer cover member 60 has an inner diameter that respectively enables the outer peripheral surface of the terminal fixing portion 40 to be covered. Here, the inner diameter of the cylindrical portion 62 is substantially identical to an outer diameter of the terminal fixing portion 40 so that the terminal fixing portion 40 can be accommodated in the outer cover member 60 with substantially no gap between an inner peripheral surface of the cylindrical portion 62 of the outer cover member 60 and the outer peripheral surface of the terminal fixing portion 40. In this embodiment, the cylindrical portion 62 of the outer cover member 60 functions as the deformation restricting portion for restricting deformation of the outer peripheral surface 40b of the terminal fixing portion 40.

An opening 63 having an inner diameter sufficient for allowing the electrode terminal 30 and sealing material 70, which are fitted into the terminal fixing portion 40, to pass through is formed in a ceiling portion 61 of the outer cover member 60 opposing the top end portion 40a of the terminal fixing portion 40. The aforementioned pressure application portion 64 is provided on the ceiling portion 61 of the outer cover member 60 on a surface opposing the top end portion 40a of the terminal fixing portion 40. The pressure application portion 64 compresses the top end portion 40a of the terminal fixing portion 40 in order to cause the terminal fixing portion 40 to deform. In this embodiment, the pressure application portion 64 is provided on the outer cover member 60 so as to compress an inside edge portion 43 of the top end portion 40a of the terminal fixing portion 40.

In this embodiment, as shown in FIG. 5, when the terminal fixing portion 40 is being covered by the outer cover member 60, the pressure application portion 64 is provided on a peripheral edge portion of the opening 63 formed in the ceiling portion 61 so that the pressure application portion 64 compresses the inside edge portion 43 of the top end portion 40a of the terminal fixing portion 40. Furthermore, in this embodiment, the pressure application portion 64 is formed by a projection projecting toward the inside of the outer cover member 60 (the side opposing the terminal fixing portion 40). Note that the pressure application portion 64 is formed as a ring-shaped projection so as to oppose the inside edge portion 43 of the top end portion 40a of the terminal fixing portion 40 continuously in a circumferential direction. Further, the pressure application portion 64 includes an indentation 66 in a base end portion of the projection. In this embodiment, the indentation 66 is provided continuously in the circumferential direction in an outer diameter-side base end portion of the pressure application portion 64 formed as a ring-shaped projection.

The outer cover member 60 is formed from a material having a greater hardness than the terminal fixing portion 40. Furthermore, in this embodiment, a material having an insulating property is used for the outer cover member 60 to ensure that the periphery of the electrode terminal 30 is insulated. Materials for forming the outer cover member 60 may include polyetheretherketone (PEEK), which is a hard resin having an insulating property, a glass-based resin, a material in which an insulating film is formed on a metal (SUS, for example) having a required strength with respect to the terminal fixing portion 40, and a ceramic.

In this embodiment, as shown in FIG. 5, the sealing material 70 is attached to the outer periphery of the electrode terminal 30. At this time, the sealing material 70 is attached so as to cover the groove 32 formed around and at an intermediate portion of the electrode terminal 30. Next, the electrode terminal 30 attached with the sealing material 70 is fitted into the through hole 42 in the terminal fixing portion 40. The terminal fixing portion 40 is then covered by the outer cover member 60. At this time, the electrode terminal 30 and sealing material 70 fitted to the terminal fixing portion 40 is inserted into the opening 63 formed in the ceiling portion 61 of the outer cover member 60, and the ceiling portion 61 of the outer cover member 60 covers the top end portion 40a of the terminal fixing portion 40. In this state, the pressure application portion 64 provided on the inside of the ceiling portion 61 opposes the inside edge portion 43 of the terminal fixing portion 40. Further, the cylindrical portion 62 (deformation restricting portion) of the outer cover member 60 covers the outer peripheral surface of the terminal fixing portion 40. The respective components assembled in this manner are then set in upper and lower caulking jigs 200, 300 disposed on a compressing device (not shown).

The upper side caulking jig 200 compresses against the outer cover member 60 of the assembly including the electrode terminal 30, sealing material 70, lid body 14, and outer cover member 60 and assembled as shown in FIG. 5. As shown in FIG. 5, the caulking jig 200 has a flat compressing surface 200a that compresses against the ceiling portion 61 of the outer cover member 60. Further, a hole 200b allowing the electrode terminal 30 and sealing material 70 to pass is formed in the caulking jig 200 so that the caulking jig 200 does not come into contact with the electrode terminal 30 and sealing material 70 projecting from the opening 63 formed in the ceiling portion 61 of the outer cover member 60.

The lower side caulking jig 300 compresses against a lower surface of the lid body 14 (a lower end portion of the terminal fixing portion 40) of the assembly including the electrode terminal 30, sealing material 70, lid body 14, and outer cover member 60 and assembled as shown in FIG. 5. The caulking jig 300 has a compressing surface 300a that compresses against the lower surface of the lid body 14 (the lower end portion of the terminal fixing portion 40). Further, a hole 300b is formed to allow the electrode terminal 30 and sealing material 70 fitted to the terminal fixing portion 40 to pass. Further, a projection 300c that compresses against an inside edge portion 45 of the terminal fixing portion 40 is provided on a peripheral edge portion of the hole 300b. In this embodiment, the projection 300c is a ring-shaped projection formed continuously in the circumferential direction so as to compress against the entire circumference of the inside edge portion 45 on the lower side of the terminal fixing portion 40.

Figure 6:
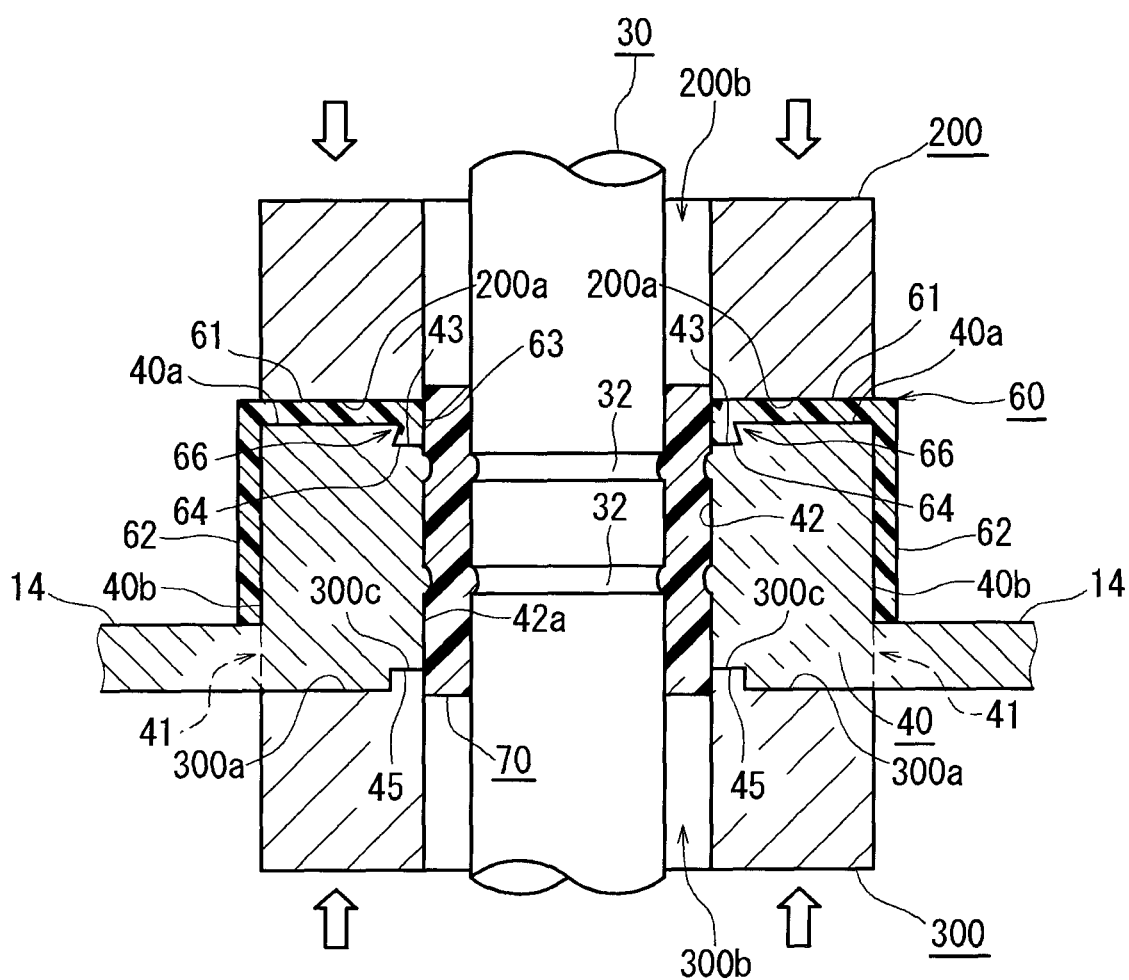
FIG. 6 is a view showing a process for fixing the electrode terminal of the battery according to an embodiment of the present invention.

The upper and lower caulking jigs 200, 300 are provided on the compressing device (not shown), and the assembly of the electrode terminal 30, sealing material 70, lid body 14, and outer cover member 60 is assembled by being compressed from above and below, as shown in FIG. 6. At this time, the upper side caulking jig 200 compresses the ceiling portion 61 of the outer cover member 60 against the top end portion 40a of the terminal fixing portion 40 and compresses the pressure application portion 64 into the inside edge portion 43 on the upper side of the terminal fixing portion 40. In this embodiment, the pressure application portion 64 is formed from a projection projecting toward the inside (the side opposing the terminal fixing portion 40) of the outer cover member 60, and therefore the inside edge portion 43 on the upper side of the terminal fixing portion 40 is plastically deformed into a recessed shape. The lower side of the terminal fixing portion 40 is compressed by the lower side caulking jig 300. At this time, the ring-shaped projection 300c provided on the lower side caulking jig 300 is compressed into the inside edge portion 45 on the lower side of the terminal fixing portion 40, and therefore the inside edge portion 45 is plastically deformed into a recessed shape.

Accordingly, deformation of the terminal fixing portion 40 is focused on the recesses formed in the upper and lower inside edge portions 43, 45. At this time, the outer peripheral surface of the terminal fixing portion 40 is covered by the cylindrical portion 62 of the outer cover member 60, and therefore deformation of the outer peripheral surface of the terminal fixing portion 40 is restricted by the cylindrical portion 62. Furthermore, in this embodiment, the top end portion 40a of the terminal fixing portion 40 is covered by the ceiling portion 61 of the outer cover member 60, and therefore deformation of the top end portion 40a of the terminal fixing portion 40 is restricted by the ceiling portion 61. Further, deformation of the lower side of the terminal fixing portion 40 is restricted by the lower side caulking jig 300. Meanwhile, the electrode terminal 30 and the sealing material 70 wound around the outer periphery thereof are fitted against an inside surface 42a of the through hole 42 formed in the terminal fixing portion 40. Deformation of parts of the terminal fixing portion 40 other than the inside surface 42a is restricted, and therefore, when pressure is applied by the upper and lower caulking jigs 200, 300, the inside surface 42a deforms so as to protrude toward the inner diameter side.

When the inside surface 42a of the terminal fixing portion 40 protrudes toward the inner diameter side, the sealing material 70 and electrode terminal 30 fitted into the through hole 42 in the terminal fixing portion 40 are held tightly. Furthermore, at this time the sealing material 70 undergoes elastic deformation fits tightly to the inside surface 42a of the terminal fixing portion 40 and the outer peripheral surface of the electrode terminal 30. Thus, the through hole 42 in the terminal fixing portion 40 can be sealed. Further, a part of the inner peripheral surface of the sealing material 70 is compressed into the groove 32 formed in the outer periphery of the electrode terminal 30. As a result, the electrode terminal 30 is prevented from becoming dislodged in the axial direction thereof. Moreover, in this embodiment, the pressure application portion 64 of the outer cover member 60 is a projection which is provided on the inside of the ceiling portion 61 of the outer cover member 60 and includes the indentation 66 in the base end portion thereof. Around the pressure application portion 64, a part of the terminal fixing portion 40 is compressed into the indentation 66.

Once the outer cover member 60 is compressed into the terminal fixing portion 40 by the caulking jigs 200, 300 in this manner, the compression is halted and the outer cover member 60 and lid body 14 are removed from the caulking jigs 200, 300. At this time, the outer cover member 60 receives an inside pressure due to spring-back of the terminal fixing portion 40, and as a result, the outer cover member 60 covers the terminal fixing portion 40 in an integrated fashion. Furthermore, in this embodiment, a part of the terminal fixing portion 40 is compressed into the indentation 66 formed in the base end of the pressure application portion 64 of the outer cover member 60, and therefore the outer cover member 60 will not dislodge from the terminal fixing portion 40.

In this embodiment, after the electrode terminals 30 are fixed to the lid body 14 as described above, the electrode body 20 is accommodated in the angular container main body 12 in a flattened state, as shown in FIG. 1. The electrode body 20 includes the positive electrode collector 26 at one end and the negative electrode collector 28 at another end. The two electrode terminals 30 fixed to the lid body 14 are electrically connected to the positive electrode collector 26 and the negative electrode collector 28, respectively. The lid body 14 is then joined to the upper portion opening in the container main body 12. Although not shown in the drawings, an electrolyte may be injected through an injection port formed in the lid body 14. Through the processes or the like described above, the battery 100 is manufactured. Note that electrode materials 22a, 24a applied to the positive electrode sheet 22 and negative electrode sheet 24 (see FIG. 2), the electrolyte injected into the battery case 10 or the like may be selected appropriately in accordance with the battery type or the like.

As described above, and as shown in FIG. 3, the battery 100 includes the tubular terminal fixing portion 40 projecting to the outside of the lid body 14, and the outer cover member 60 covering the terminal fixing portion 40. The electrode terminal 30 is inserted into the terminal fixing portion 40. The outer cover member 60 includes the cylindrical portion 62 (deformation restricting portion) that covers the outer peripheral surface 40b of the terminal fixing portion 40 to restrict deformation of the outer peripheral surface 40b of the terminal fixing portion 40. The outer cover member 60 also includes the pressure application portion 64 that compresses against the top end portion 40a of the terminal fixing portion 40 in order to deform the terminal fixing portion 40.

In the battery 100, the pressure application portion 64 of the outer cover member 60 compresses against the top end portion 40a of the terminal fixing portion 40 to deform the terminal fixing portion 40. At this time, deformation of the outer peripheral surface 40b of the terminal fixing portion 40 is restricted by the cylindrical portion 62 (deformation restricting portion) of the outer cover member 60, and therefore the inside surface of the terminal fixing portion 40 protrudes toward the inner diameter side. As a result, the electrode terminal inserted into the terminal fixing portion 40 is fixed firmly to the terminal fixing portion 40.

Furthermore, in this embodiment, the sealing material 70 is attached between the inner periphery of the terminal fixing portion 40 and the outer periphery of the electrode terminal 30. By causing the sealing material 70 to elastically deform, the sealing material 70 is attached tightly to the inner peripheral surface of the terminal fixing portion 40 and the outer peripheral surface of the electrode terminal 30, and therefore the site in which the electrode terminal 30 is inserted into the terminal fixing portion 40 is sealed securely. Further, the pressure application portion 64 of the outer cover member 60 is provided on the outer cover member 60 so as to compress against the inside edge portion 43 of the top end portion 40a of the terminal fixing portion 40. Therefore, deformation centering on the vicinity of the site in which the electrode terminal 30 is inserted into the terminal fixing portion 40 can be generated, and as a result, the electrode terminal 30 can be held even more firmly and the site in which the electrode terminal 30 is inserted into the terminal fixing portion 40 can be sealed even more securely.

Each dimension of the battery 100, such as its length, width, and height, are limited by the application and specifications of the battery 100. Furthermore, to obtain a required output, a battery pack may be formed by combining a plurality of batteries, but when the site to which the electrode terminal 30 is fixed projects beyond the width of the battery case 10, this site may cause an obstruction to an adjacent battery such that the battery pack cannot be constructed compactly. A battery pack installed in an automobile requires a compact constitution, and it is therefore desirable to ensure that the site to which the electrode terminal 30 is fixed does not cause an obstruction to an adjacent battery when a plurality of batteries are combined. Hence, there is a limitation to the width of the site to which the electrode terminal 30 is fixed.

Figure 15:
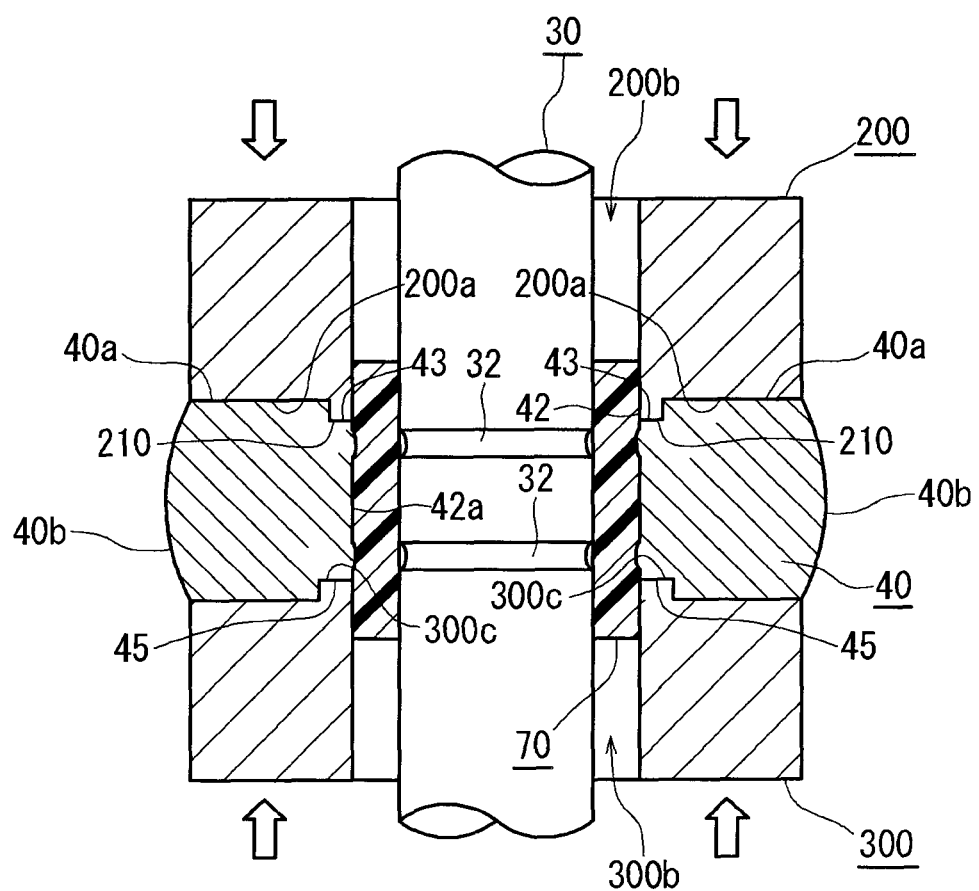
FIG. 15 is a view showing an electrode terminal fixing process according to a comparative example.

When the outer cover member 60 is not provided, as shown in FIG. 15, deformation of the outer peripheral surface 40b of the terminal fixing portion 40 is not restricted during compression from above and below, and therefore the terminal fixing portion 40 may readily protrude toward an outer diameter side. When the terminal fixing portion 40 protrudes toward the outer diameter side, protrusion toward the inner diameter side decreases, and as a result, the force for holding the electrode terminal 30 decreases.

In the battery according to this embodiment, on the other hand, the outer cover member 60 covers the terminal fixing portion 40, as shown in FIGS. 1 and 3, and therefore deformation of the outer peripheral surface 40b of the terminal fixing portion 40 can be restricted. In this case, the outer cover member 60 may be formed from a stronger material than the terminal fixing portion 40 so that deformation of the outer peripheral surface 40b of the terminal fixing portion 40 can be restricted more firmly. As a result, the terminal fixing portion 40 is prevented from protruding toward the outer diameter side, whereby protrusion toward the inner diameter side of the terminal fixing portion 40 can be increased and the force for holding the electrode terminal 30 can be increased.

Moreover, in this embodiment, after being attached to and compressed against the terminal fixing portion 40, the outer cover member 60 is integrated with the lid body 14 while covering the terminal fixing portion 40. The outer cover member 60 also functions to protect the part into which the electrode terminal 30 is inserted. Therefore, a material with high corrosion resistance and exhibits an insulating property may be selected for use as the outer cover member 60. Furthermore, the outer cover member 60 does not protrude toward the outer diameter side even after receiving spring back from the terminal fixing portion 40. Hence, the air-tightness of the battery 100 can be stability maintained over time, leading to an increase in the lifespan of the battery 100.

Further, in this embodiment, the inside edge portion 43 of the top end portion 40a of the terminal fixing portion 40 is deformed when compressed by the pressure application portion 64 provided on the outer cover member 60. The outer cover member 60 is being fixed while covering the terminal fixing portion 40 and becomes a part of the lid body 14. In this case, as shown in FIG. 6, there is no need to provide a projection on the caulking jig 200 for compressing the outer cover member 60.

However, when the outer cover member 60 is not being provided, as shown in FIG. 15, for example, the caulking jig 200 for compressing the top end portion of the terminal fixing portion 40 must be provided with a projection 210 for compressing the inside edge portion 43 of the top end portion 40a of the terminal fixing portion 40. This projection 210 is repeatedly compressed into the inside edge portion 43 of the top end portion 40a of the terminal fixing portion 40, and is therefore likely to become worn and damaged. As a result, the caulking jig 200 becomes a consumable component that must be replaced at relatively short intervals. In this embodiment, as shown in FIGS. 5 and 6, the caulking jig 200 for compressing the outer cover member 60 does not require the projection 210 shown in FIG. 15. Therefore, the caulking jig 200 for compressing the outer cover member 60 can be used over a prolonged period, enabling a reduction in the running costs of a manufacturing facility.

A battery according to an embodiment of the present invention was described above, but the battery according to the present invention is not limited to the above embodiment.

For example, in this embodiment, a lithium ion battery was cited as an example of a battery structure, but the present invention may be applied widely to batteries other than a lithium ion battery. Further, the present invention may be applied widely as a structure for fixing an electrode terminal to a battery case, and is not limited by the electrode body constituting the battery, the type of the electrolyte, and the shape of the battery case.

Furthermore, in the embodiment described above, the electrode terminal is fixed to the lid body, but the site to which the electrode terminal is fixed may be modified in accordance with the specific configuration of the battery and battery case. For example, the electrode terminal may be fixed to the container main body. In this case, the tubular terminal fixing portion into which the electrode terminal is inserted may be provided in the container main body of the battery case. Further, the shape of the electrode terminal is not limited to that of the above embodiment. For example, the electrode terminal may be an angular rod-shaped member. Moreover, in the above embodiment, a groove is formed in the outer periphery of the electrode terminal, but in this case, the position of the groove, the number of grooves and the like are not limited to those of the above embodiment.

Further, in the outer cover member, the deformation restricting portion (in the above embodiment, the cylindrical portion 62) that covers the outer peripheral surface of the terminal fixing portion in order to restrict deformation of the outer peripheral surface of the terminal fixing portion, for example, is preferably highly rigid. However, limitations on the thickness or the like of the outer cover member may occur, and therefore the deformation restricting portion of the outer cover member may be provided with a reinforcing shape pattern, for example. This reinforcing shape pattern may be formed by performing predetermined pattern punching on the outer peripheral surface of the deformation restricting portion, for example.

Figure 7:
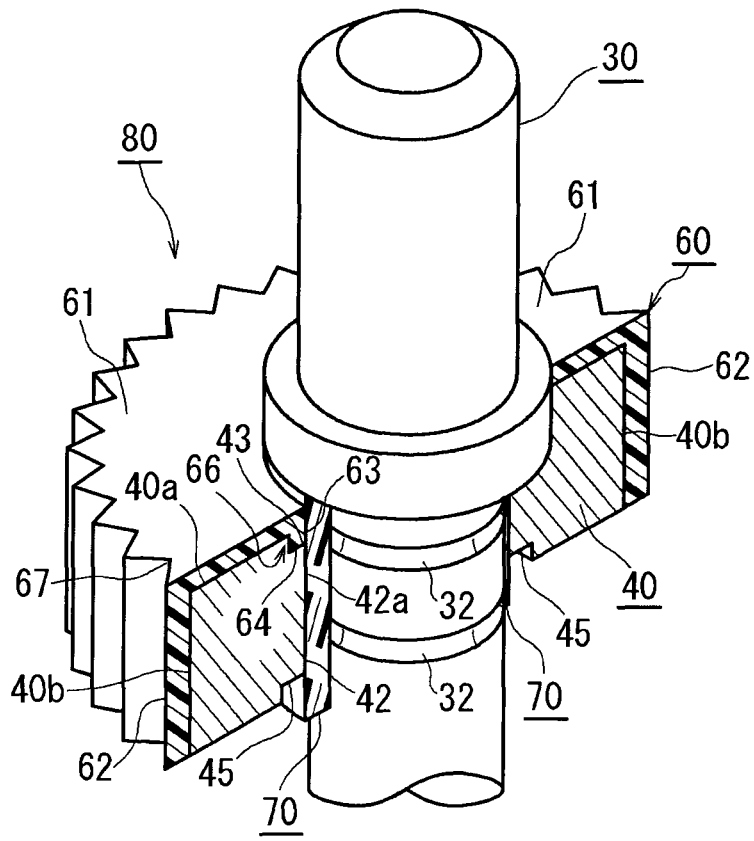
FIG. 7 is a partial sectional perspective view showing an electrode terminal fixing structure of a battery according to another embodiment of the present invention.
Figure 8:
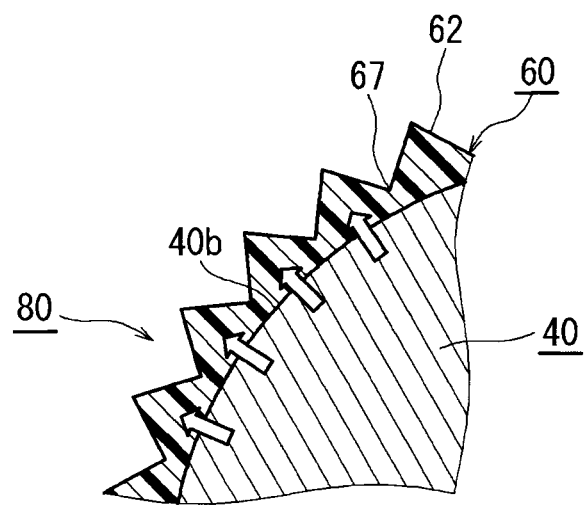
FIG. 8 is a sectional view showing an outer cover member of a battery according to another embodiment of the present invention.

As shown in FIG. 7, for example, a plurality of ribs 67 may be formed on the outer peripheral surface of the outer cover member 60 as a reinforcing shape pattern 80. The ribs 67 shown in FIG. 7 are projections provided in a vertical direction on the outer peripheral surface of the outer cover member 60 and formed in a plurality in a circumferential direction. The ribs 67 may be transferred onto the outer cover member 60 by knurling or the like, for example. When the ribs 67 are formed on the outer peripheral surface of the outer cover member 60, a force that acts to cause the terminal fixing portion 40 to protrude toward the outer diameter side can be dispersed due to the characteristics of the cross-sectional shape of the outer cover member 60, as shown in FIG. 8. As a result, the strength of the outer cover member 60 can be improved, and deformation of the outer peripheral surface of the terminal fixing portion 40 can be restricted more reliably.

Figure 9:
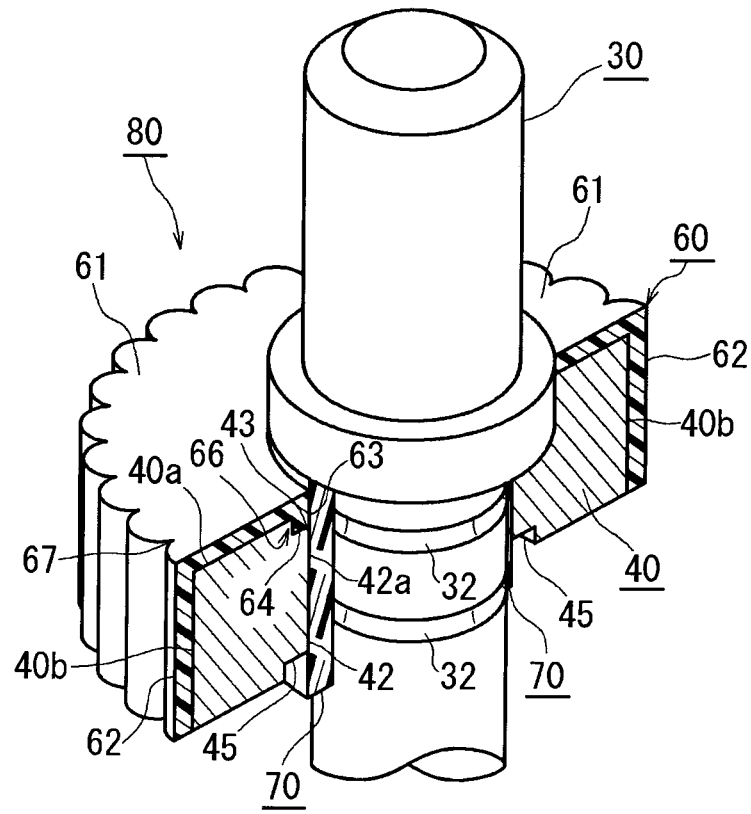
FIG. 9 is a partial sectional perspective view showing an electrode terminal fixing structure of a battery according to another embodiment of the present invention.
Figure 10:
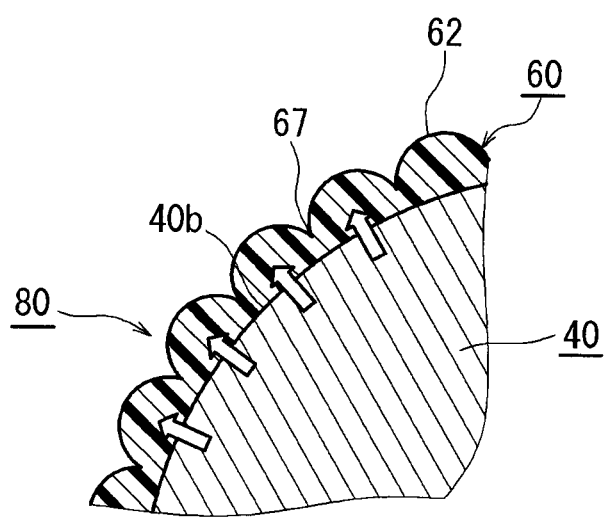
FIG. 10 is a sectional view showing an outer cover member of a battery according to another embodiment of the present invention.
Figure 11:
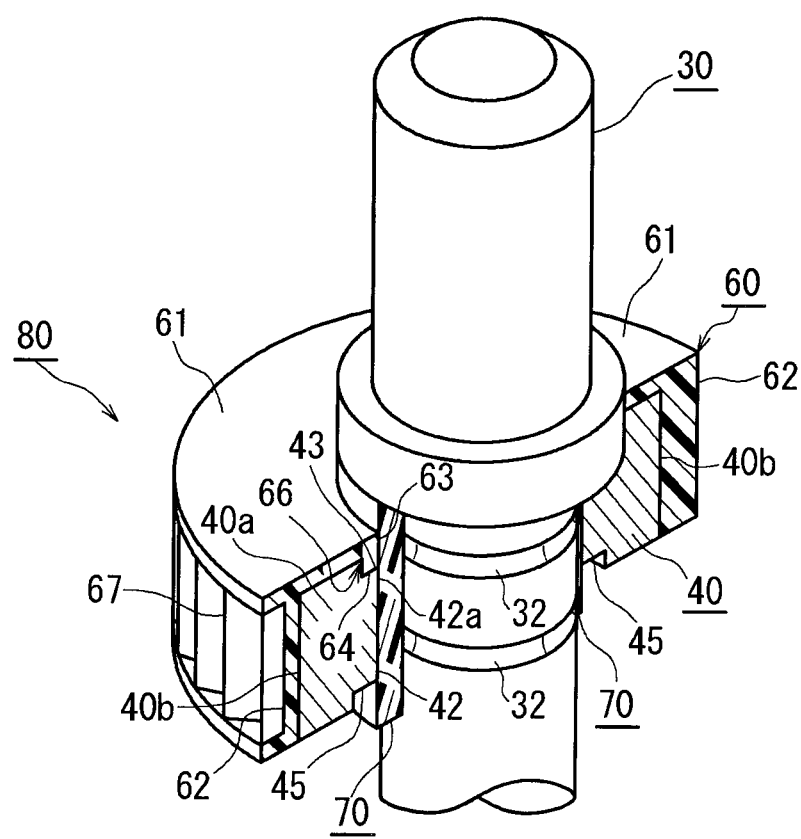
FIG. 11 is a partial sectional perspective view showing an electrode terminal fixing structure of a battery according to another embodiment of the present invention.

The reinforcing shape pattern 80 is not limited to that described above. In the reinforcing shape pattern 80 shown in FIG. 7, for example, angular ridges and valleys are formed alternately, but as shown in FIG. 9, the ribs 67 may be formed in a circular ridge shape such that a plurality of the circular ridge-shaped ribs 67 are formed in the circumferential direction. As shown in FIG. 10, even when the ribs 67 are formed in a circular ridge shape, the force that acts to cause the terminal fixing portion 40 to protrude toward the outer diameter side can be dispersed due to the characteristics of the cross-sectional shape of the outer cover member 60. Further, as shown in FIG. 11, the reinforcing shape pattern 80 may be formed in only an axial direction in the intermediate part of the cylindrical portion 62 of the outer cover member 60. In this case, shape strength reinforcement can be achieved between the axial direction in the intermediate portion of the cylindrical portion 62 of the outer cover member 60 and the two end portions of the cylindrical portion 62 of the outer cover member 60, leading to an improvement in the strength of the outer cover member 60. As a result, deformation of the outer peripheral surface of the terminal fixing portion 40 can be restricted even more reliably.

Further, in the above embodiment, as shown in FIG. 5, the top end portion 40a of the terminal fixing portion 40 is flat and the pressure application portion 64 is formed on the outer cover member 60 as a projection. In this case, as shown in FIG. 6, the pressure application portion 64 of the outer cover member 60 is compressed into the top end portion 40a of the terminal fixing portion 40 when the outer cover member 60 is compressed against the top end portion 40a of the terminal fixing portion 40, and as a result, causing the terminal fixing portion 40 to deform.

Figure 12:
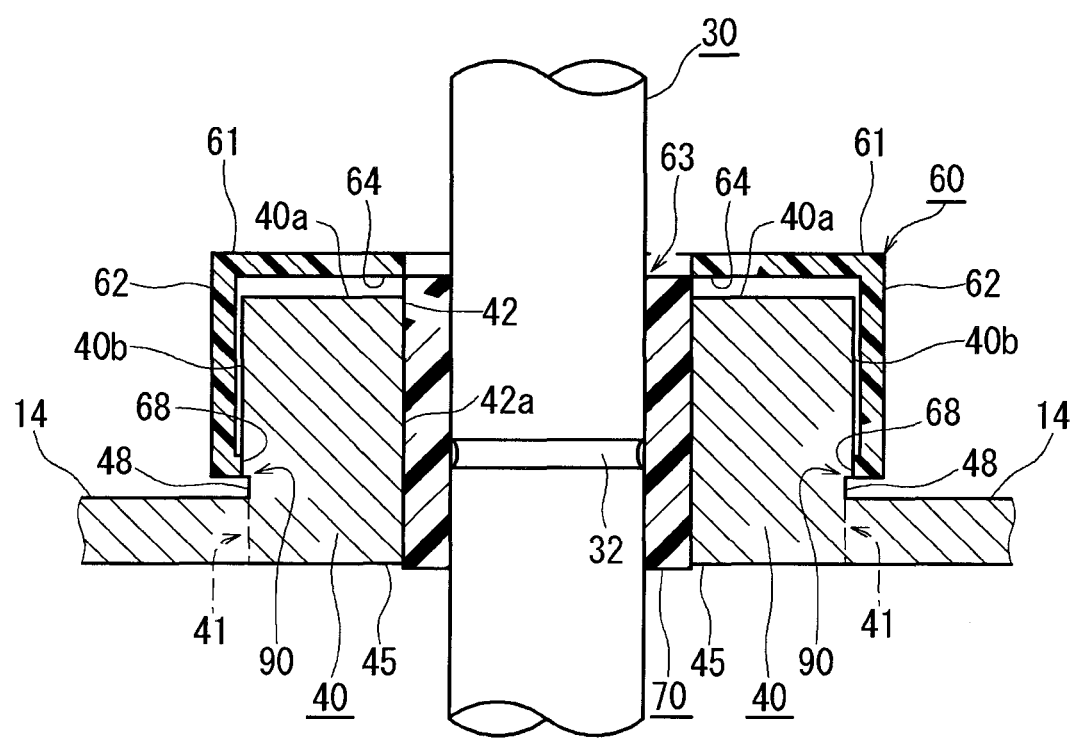
FIG. 12 is a view showing a state prior to fixing an electrode terminal of a battery according to another embodiment of the present invention.
Figure 13:
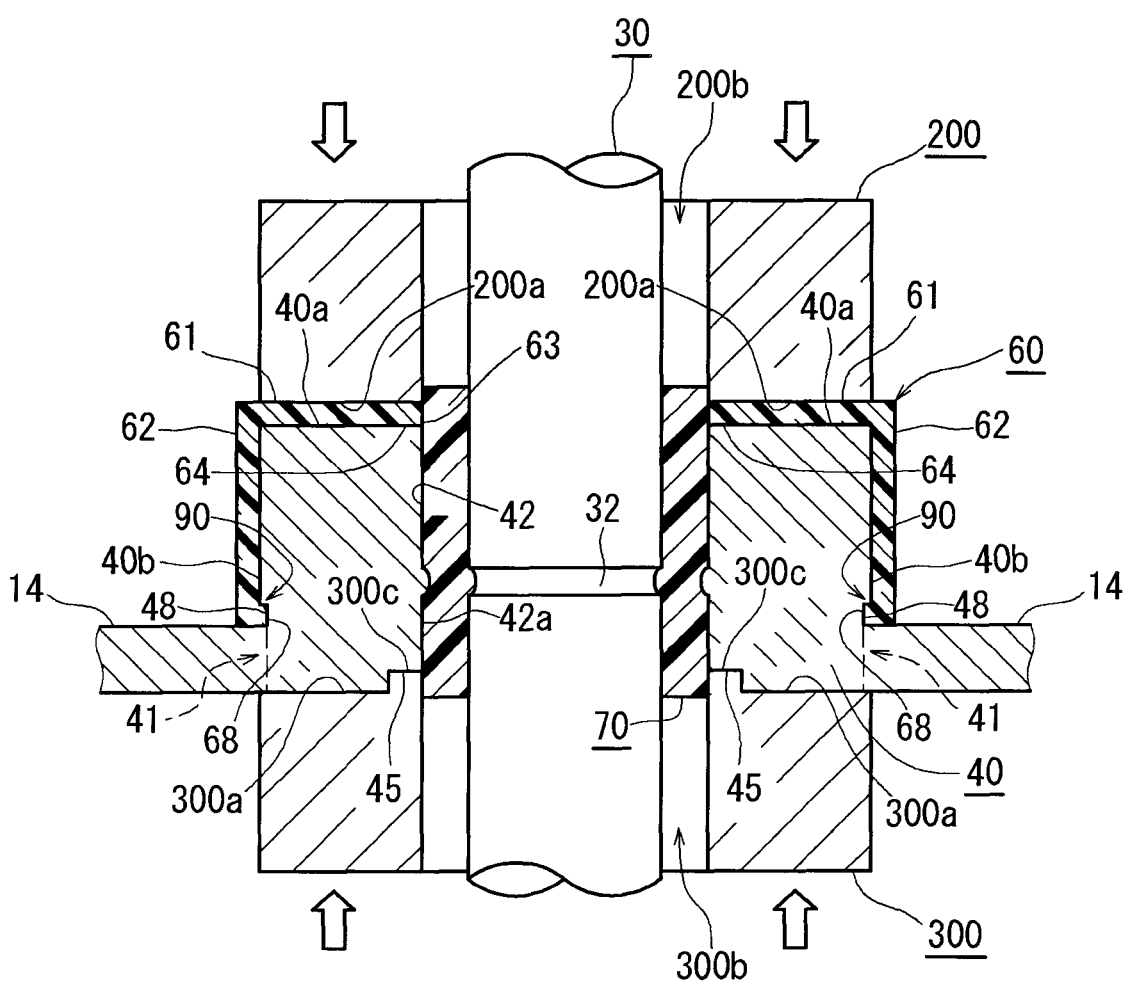
FIG. 13 is a view showing a process for fixing an electrode terminal of a battery according to another embodiment of the present invention.

Alternatively, the pressure application portion 64 of the outer cover member 60 may be formed flat so as to compress against the opposing top end portion 40a of the terminal fixing portion 40, as shown in FIGS. 12 and 13. In the embodiment shown in FIGS. 12 and 13, the outer cover member 60 and the terminal fixing portion 40 include an engaging portion 90 that engages the outer cover member 60 with the terminal fixing portion 40 when the terminal fixing portion 40 is covered by the outer cover member 60. The engaging portion 90 is constituted by a projection 68 that projects inwardly from a lower end portion of the cylindrical portion 62 of the outer cover member 60, and an indentation 48 provided on the base end portion of the terminal fixing portion 40, into which the projection 68 on the outer cover member 60 can fit. Further, the lower side caulking jig 300 includes a projection 300c (see FIG. 13) that compresses against the inside edge portion 45 of the terminal fixing portion 40.

In this case, as shown in FIG. 13, when the outer cover member 60 is compressed against the top end portion 40a of the terminal fixing portion 40 by the upper and lower caulking jigs 200, 300, the top end portion 40a of the terminal fixing portion 40 is compressed by the ceiling portion 61 of the outer cover member 60. When the top end portion 40a of the terminal fixing portion 40 is compressed by the ceiling portion 61 of the outer cover member 60 so as to deform by a predetermined amount, the projection 68 provided on the lower end portion of the cylindrical portion 62 of the outer cover member 60 fits into the indentation 48 provided in the base end portion of the terminal fixing portion 40.

As a result, the outer cover member 60 is engaged with the terminal fixing portion 40 while covering the terminal fixing portion 40. By means of the engagement between the projection 68 and the indentation 48, the outer cover member 60 is fixed while covering the terminal fixing portion 40. Further, the lower side of the terminal fixing portion 40 is compressed by the lower side caulking jig 300 such that the ring-shaped projection 300c on the lower side caulking jig 300 is compressed into the inside edge portion 45 on the lower side of the terminal fixing portion 40.

Accordingly, the inside edge portion 45 of the terminal fixing portion 40 is plastically deformed into a recessed shape. At this time, the inner peripheral surface of the terminal fixing portion 40 protrudes inward due to this plastic deformation, and as a result of this deformation of the terminal fixing portion 40, the electrode terminal 30 is fixed. In this case, the inner side of the ceiling portion 61 of the outer cover member 60 compresses against the top end portion 40a of the terminal fixing portion 40. Hence, the inner side of the ceiling portion 61 of the outer cover member 60 functions as the pressure application portion 64 for deforming the terminal fixing portion 40.

In the embodiment described above, the sealing material 70 is attached to the outer periphery of the electrode terminal 30 separately to the electrode terminal 30. However, the sealing material 70 is not limited to this form. For example, the sealing material 70 may be provided on the outer peripheral surface of the electrode terminal 30 in advance by curing adhesion or the like.

Further, in the embodiment described above, the terminal fixing portion 40 is welded to the lid body 14 in advance, but the terminal fixing portion 40 need not be welded to the lid body 14 in advance. More specifically, a tubular terminal fixing member corresponding to the terminal fixing portion 40 may be prepared, the electrode terminal 30 may be inserted into this terminal fixing member, and then covering the terminal fixing member with the outer cover member 60 to fix the electrode terminal 30 thereto (see FIG. 3). Further, the terminal fixing portion 40 may be welded to the lid body 14 after attaching the electrode terminal 30 and fitting the outer cover member 60.

More specifically, a tubular terminal fixing member corresponding to the terminal fixing portion 40 is prepared. An electrode terminal component is then created by inserting the electrode terminal 30 into the terminal fixing member and fixing the electrode terminal 30 to the terminal fixing member by placing the outer cover member 60 over the terminal fixing member. This electrode terminal component may then be welded to an appropriate position of the battery case 10. In this case, the outer cover member 60 may include the deformation restricting portion 62, which covers the outer peripheral surface of the terminal fixing portion 40 to restrict deformation of the outer peripheral surface of the terminal fixing portion 40, and the pressure application portion 64, which compresses against the top end portion 40a of the terminal fixing portion 40 to deform the terminal fixing portion 40. The electrode terminal component in this case exhibits superior mass productivity and universality, and therefore an improvement in the production efficiency of the battery can be achieved.

Figure 14:
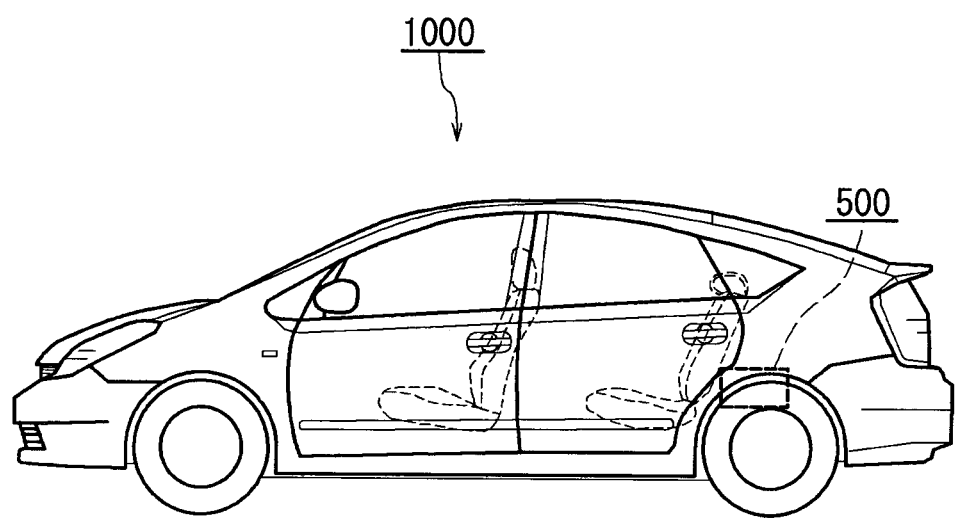
FIG. 14 is a schematic side view showing a vehicle (an automobile) installed with a battery pack.

Further, in the battery according to this embodiment of the present invention, the structure for fixing the electrode terminal 30 to the battery case 10 can be formed compactly. Moreover, the battery case 10 is securely sealed and highly reliable over time. Hence, this battery is suitable for use in a battery pack 500 formed by combining a plurality of the batteries, and may also be installed in a vehicle 1000 (typically an automobile, in particular an automobile having a motor such as a hybrid automobile, an electric automobile, or a fuel cell automobile), as shown in FIG. 14.

What is claimed is:
1. A battery in which an electrode terminal is fixed to a battery case in an inserted state, comprising:
a terminal fixing portion that projects outwardly from said battery case and includes a hole into which said electrode terminal is inserted; and
an outer cover member completely external to the battery case, the outer cover member being in contact with and covering an outer peripheral surface facing in a radial direction and a top end surface facing in a projecting direction of said terminal fixing portion, wherein said outer cover member includes:
a deformation restricting portion that covers the outer peripheral surface and the top end surface of said terminal fixing portion; and
a pressure application portion projecting from the inner surface of the outer cover member and compressed into the top end portion of the terminal fixing portion, wherein the terminal fixing portion is deformed by the pressure application portion, and wherein the electrode terminal inserted into the hole is fixed to the terminal fixing portion of which an inside surface is protruded toward the inner diameter side.

2. The battery according to claim 1, wherein said terminal fixing portion is tubular, and a sealing material is attached between an inner periphery of said terminal fixing portion and an outer periphery of said electrode terminal.

3. The battery according to claim 1, wherein said pressure application portion is provided on said outer cover member so as to compress against an inside edge portion of said top end surface of said terminal fixing portion.

4. The battery according to claim 1, wherein said pressure application portion is a projection provided on an inner side of a ceiling portion of said outer cover member.

5. The battery according to claim 4, wherein an indentation is provided in a base end portion of said projection constituting said pressure application portion.

6. The battery according to claim 1, wherein an outer peripheral surface of said deformation restricting portion has a reinforcing shape pattern.

7. The battery according to claim 6, wherein said reinforcing shape pattern includes a rib.

8. A battery pack formed by combining a plurality of said batteries according to claim 1.

9. A vehicle in which said battery pack according to claim 8 is installed as a vehicle power supply.

10. The battery according to claim 1, wherein the terminal fixing portion is completely enclosed by the outer cover member.

11. The battery according to claim 1, wherein the outer cover member further includes an opening having a diameter substantially equal to a diameter of the hole of the terminal fixing portion.

12. The battery according to claim 1, wherein said outer cover member is harder than the terminal fixing portion.

13. A battery comprising:
a battery case configured to received an electrode body;
an electrode terminal configured to be inserted into the case;
a terminal fixing portion projecting outwardly from the case and including a hole configured to receive the electrode terminal; and
an outer cover member completely external to the case, the outer cover member being in contact with and covering an outer peripheral surface facing in a radial direction and a top end surface facing in a projecting direction of the terminal fixing portion, wherein the outer cover member includes:
a deformation restricting portion covering the outer peripheral surface of the terminal fixing portion and configured to restrict deformation of the outer peripheral surface; and
a pressure application portion configured to deform the terminal fixing portion by compressing against the top end surface of the terminal fixing portion; and wherein the top end surface faces away from an interior of the battery case.

14. The battery according to claim 13, wherein the outer cover member includes a ceiling portion extending substantially perpendicular to the deformation restricting portion, and wherein the pressure application portion extends from an inner side of the ceiling portion.

15. The battery according to claim 13, wherein the terminal fixing portion is completely enclosed by the outer cover member.

16. The battery according to claim 13, wherein the outer cover member further includes an opening having a diameter substantially equal to a diameter of the hole of the terminal fixing portion.

17. The battery according to claim 13, further comprising an engaging portion configured to engage the outer cover member with the terminal fixing portion when the terminal fixing portion is covered by the outer cover member, wherein the engaging portion comprises:
a projection that projects from a lower end portion of the deformation restricting portion; and
an indentation disposed on a base end portion of the terminal fixing portion,
wherein the projection is configured to engage with the indentation to fix the outer cover member to the terminal fixing portion.

18. A battery in which an electrode terminal is fixed to a battery case in an inserted state, comprising:
a terminal fixing portion that projects outwardly from the battery case and includes a hole into which the electrode terminal is inserted; and
an outer cover member completely external to the battery case;
wherein the outer cover member is harder than the terminal fixing portion,
wherein the outer cover member includes:
a ceiling portion in contact with, covering, and compressing a top end surface facing in a projecting direction of the terminal fixing portion; and
a cylindrical portion covering and compressing an outer peripheral surface facing in a radial direction of the terminal fixing portion,
wherein the outer cover member and the terminal fixing portion together define an engaging portion,
wherein an inside edge portion of the terminal fixing portion is plastically deformed into a recessed shape, and
wherein the electrode terminal inserted into the hole is fixed to the terminal fixing portion of which an inside surface is protruded toward an inner diameter side.

* * * * *